May 12, 1936.  G. B. COE  2,040,361
METHOD AND APPARATUS FOR SHAPING STOCK
Original Filed Feb. 9, 1931  8 Sheets-Sheet 3

Patented May 12, 1936

2,040,361

UNITED STATES PATENT OFFICE 2,040,361

METHOD AND APPARATUS FOR SHAPING STOCK

George B. Coe, Waterbury, Conn., assignor, by mesne assignments, to Tube Reducing Corporation, Wilmington, Del., a corporation of Delaware Application February 9, 1931, Serial No. 514,368
Renewed October 14, 1933

28 Claims. (Cl. 82—14)

This invention relates to metal working methods and machines and more particularly to methods and machines for shaping die cavities in forming dies, especially when such dies have curved working faces such, for example, as the swaging or roller dies employed in the reducing machines, although it will be apparent that various features of the invention are equally well adapted to metal working machines generally, irrespective of the particular type of work operated upon.

An object of this invention is to provide an improved machine of the type set forth constructed and arranged to shape die cavities of various predetermined contours in curved surfaces.

A further object is to provide an improved method of forming grooves of predetermined contours in work pieces.

These and other objects which will be apparent to those skilled in this particular art are accomplished by means of the invention illustrated in the accompanying drawings in which.

Fig. 2 is a top plan view thereof.

Fig. 3 is an end elevation looking from the left of Fig. 1.

The particular embodiment of the present invention which has been chosen for the purposes of illustration comprises a machine which is especially adapted to form and shape the die cavities in a pair of rocker swaging dies, such as are employed in certain forms of tube reducing machines, although it will be apparent that the invention is equally well adapted for use in the shaping of other types of work. However, for the purposes of disclosure, the following description relates to a machine for shaping die cavities in such rocker swaging dies.

As illustrated, the present machine is arranged to simultaneously shape complemental die cavities in pairs of co-operating rocker dies and such die cavities are so formed as to taper gradually for a portion of their length, such portion being eccentric to the axis of rotation of the rocker, the remainder of the cavity being straight sided and concentric with said axis. Enlarged clearance portions are formed at each end of the groove. In the present machine, a rotary work holder is provided for supporting a pair of rockers or other die members in position to be rotated about a stationary cutter in such a way that the complemental die cavities are simultaneously formed in the two rockers. The latter are supported for relative movement on the work holder to permit their being fed past the cutter during the cutting operation, the cutter being positioned on the line of centers between the points about which the rockers are rotated to provide this feeding movement. The cutter is mounted upon a cross slide and means is provided for automatically controlling the slide during the cutting operation so as to obtain any desired configuration of cavity in the work, tapered or otherwise. At the same time, a feed adjustment of the traverse slide is provided for the purpose of feeding the cutter into the work at the end of each cut.

As illustrated, the machine is operated from any desired source of power, such as the reversing motor 20 which drives the main shaft 21 of the machine through a suitable belt drive 22 which may be connected to and disconnected from the shaft by any suitable form of clutch 23. A rotary work holder 24 is supported upon a shaft 25 which is driven by the power shaft through suitable reduction gearing 26. The work holder has a pair of spaced, rotatable, work supporting shafts 27 supported in a housing 28 forming a part of the work support. The housing is bolted directly to the face of the work holder. Different housings are provided for accommodating different sizes of work pieces, and the appropriate housing can be easily and quickly mounted in place on the work holder. The shafts are connected by gears 29 and are actuated upon and by rotation of the work holder through a gear 30 mounted upon the projecting end of one of the work supporting shafts 27 and meshing with a gear 31 driven through a train of reduction gears 32 which is in turn operated by a gear 33 forming a part of the train and engaging a stationary gear 34 secured to the outside of the bearing supporting the adjacent end of the work holder operating shaft 25. The train of reduction gears 32, together with the work supporting shafts 27, being mounted upon the rotary work holder for rotation therewith about the stationary gear 34, it will be apparent that rotation of the work holder causes the stationary gear 34 to drive the gear reduction train 32 and through the gear 30 to slowly rotate the shafts 27 as they revolve about a cutter 35 which is located near the center line about which the shafts revolve, see Fig. 5. Hence, a compound movement is imparted to the work pieces which is produced by causing them to revolve in an orbit about the cutter to produce the cutting action, and simultaneously rotating them about the supporting shafts 27 to feed them slowly past the cutter.

In the illustrated embodiment of the invention, the machine is shown as employed in shaping or forming the die cavities 36 in complemental rocker dies 37 which are supported upon the work supporting shafts 27 in the manner shown so that upon being revolved around the cutter 35 upon rotation of the work holder 24, the cutter will shape the die faces of the two work pieces simultaneously. The cutter is mounted in a suitable cutter bar 38 secured to a traverse slide 39 slidably mounted on a sub slide 40 on which it is adjustable by suitable adjusting screw 41 operated by hand wheel 42 and provided with a micrometer dial with which to gauge the feeding increments or traverse of the cutter between successive cuts. The subslide 40 is supported upon a suitable bed 44 and is automatically controlled during the cutting operation to form any desired shape of die cavity whether it be tapered, straight, or of other form.

Figure 8:
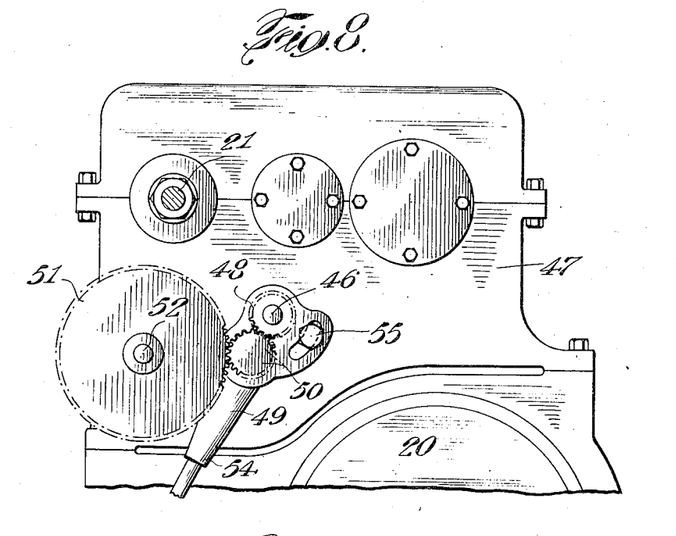
Figure 9:
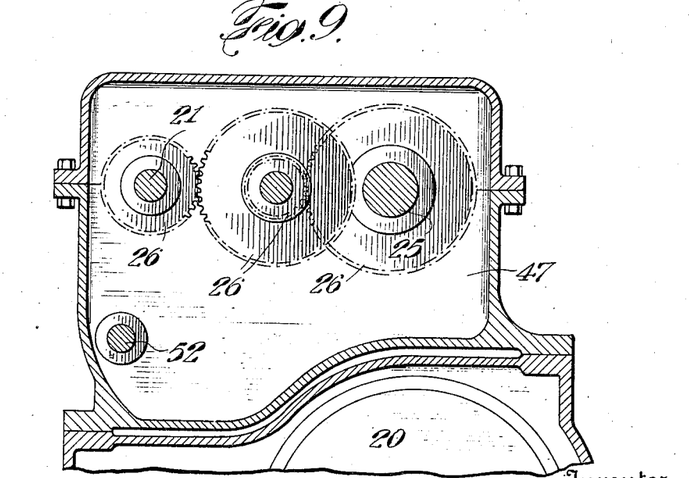
Figure 10:
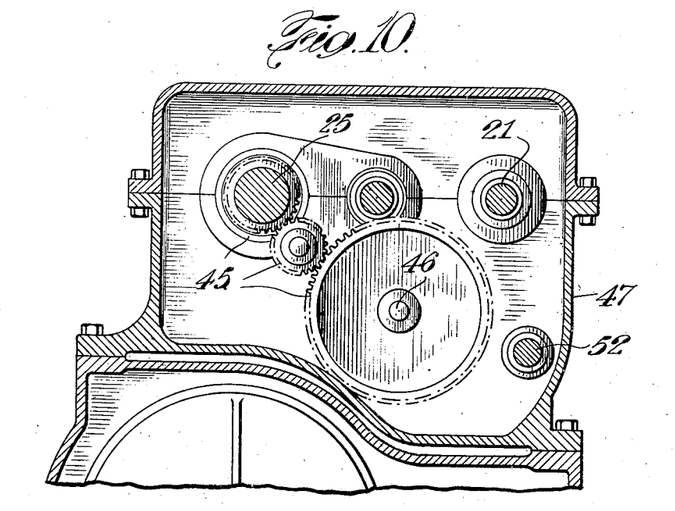
Figure 11:
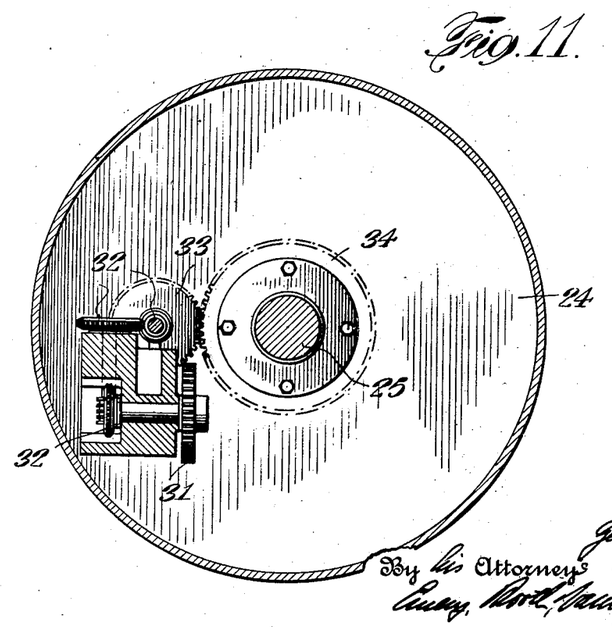
Fig. 11 is a transverse sectional view of the work holder on the line 11—11 of Fig. 2.
Figure 12:
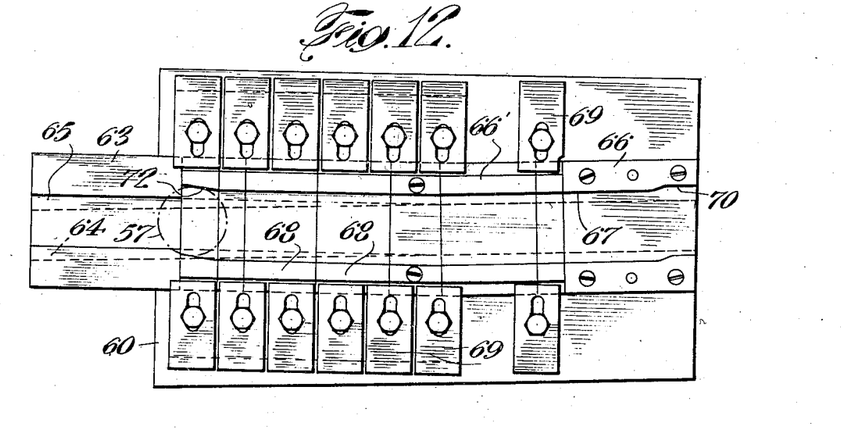
Fig. 12 is a top plan view of the pattern slide and slot forming inserts.

In the shaping of the rocker swaging dies 37, each die cavity 36 is provided with straight or cylindrical walls for a part of its length while the remainder is tapered. It will be apparent that lateral movement of the cutter 35 during the rotation of the work holder on the shaft 25 and the simultaneous rotation of the work supporting shafts 27 to swing or feed the work pieces past the cutter, during their orbital movement around it, will produce a tapered die cavity in such work pieces. This lateral shaping movement of the cutter is accomplished automatically by movement of the cutter sub slide 40 during operation of the machine. The work holder supporting shaft 25, see Figs. 2 and 10, is connected through gearing 45 to shaft 46 which projects outwardly through a wall of the gear housing 47 and has a gear 48, see Fig. 8, secured to its outer end. A gear supporting frame 49 is pivoted to the shaft 46 adjacent the gear 48 and supports an intermediate idler gear 50 which connects the gear 48 with a large pattern driving gear 51 mounted upon the adjacent end of a shaft 52 extending longitudinally of the machine and having its opposite end 53 suitably screw threaded. Any desired ratio of movement between the work holder 24 and the screw shaft 53 can be obtained by varying the size of the gear 51, the idler gear 50 being movable with the supporting frame 49 to accommodate various diameters of gear 51. A suitable handle 54 is provided for shifting the idler supporting frame 49 and the latter can be rigidly secured in adjusted position by a clamp nut 55, see Fig. 8.

The cutter supporting sub slide 40 is provided with an operating arm 56 having a roller or projection 57 engaging a slide controlling pattern slot 58 in a slide 59 supported for movement at right angles to the cutter sub slide 40.

The construction is such as to permit any desired form of slot 58 to be provided so that any desired movement can be imparted to the sub slide 40 to produce the particular form of die cavity desired. As illustrated, this is accomplished by providing a main slide 60 mounted in suitable ways 61 and connected to the threaded rod 53 as illustrated, the rod 53 is threaded to the slide 60. The main slide 60 has a groove 62 formed in the upper face thereof at an angle to the direction of movement of the slide and an intermediate slide 63 has a similarly inclined ridge 64 on the bottom thereof for engaging the groove 62 of the main slide. The intermediate slide 63 has a straight groove 65 in its upper face, and it will be apparent that adjustment of the intermediate slide 63 longitudinally in the inclined slot of the main slide 60 will cause the intermediate slide to be shifted laterally to an extent depending upon the amount of longitudinal adjustment. The particular form of the pattern slot 58 will vary with different work, and the present invention provides a plurality of removable and interchangeable slot forming inserts by means of which any shape of slot for controlling the form of cut can be built up. As illustrated, a grooved insert 66 having an inclined slot 67 is positioned on the main slide 60 and the outer end of the slot has an offset 70 for a purpose to be hereinafter described.

Obviously, the inclined slot 67 can be extended to a greater length, if desired, merely by securing additional inserts in the main slide, or by providing an insert 66 of greater length. In shaping the straight portion of the die cavity in the rocker dies, the slide 40 is held against movement by a straight portion of the pattern slot 58 formed by inserts 68 mounted on the intermediate slide 63, the inserts and slide being secured in adjusted position by clamps 69 bolted to the main pattern slide 60. The inserts 68 co-operate to provide a straight slot which forms, in effect, a continuation of the inclined slot and the extent of which is determined by the number of inserts used which, in turn, depends upon the length of the straight portion of the die cavity. The inclined groove 62 in the main slide permits the intermediate slide and superposed inserts to abut the end of the tapered slot and, hence, the sides of the inclined and straight slots register irrespective of the particular point at which they meet.

It will be apparent that movement of the main slide 60 in the ways 61, as a result of the rotation of the threaded shaft 53, will move the cutter controlling arm 56 laterally or will hold it stationary depending upon whether the roller 57 is in the inclined slot 67 formed by the inserts 66 or whether it is in the straight slot formed by the inserts 68. Where the cutter is held stationary and no lateral traverse is imparted thereto during the cutting operation, the compound movement imparted to the work pieces by being revolved around the cutter as a result of rotation of the work holder 24, and by being rotated about the work supporting shafts 27, will cause the cutter to form a straight groove in such work pieces. However, when the arm 56 is gradually moved by the inclined slot 67 to impart a gradual traverse to the cutter during the cutting operation, a tapered groove will be formed in each work piece. The offset 70 in the tapered block 68 is provided for giving the cutter such a latter movement at the end of the tapered cut as to form a bell mouth 71 at the end of the tapered portion of each groove in each work piece. At the opposite end of the straight portion of the pattern groove, an insert 72 having an inclined groove 73 is secured on the intermediate slide for the purpose of forming a slight enlargement 75 in the end of the die cavity opposite the bell mouth 71. By a suitable arrangement of inserts or construction of the pattern groove for controlling the slide arm 56, it will be apparent that any desired movement can be imparted to the cutter to form any desired type of groove in the work piece.

Figure 1:
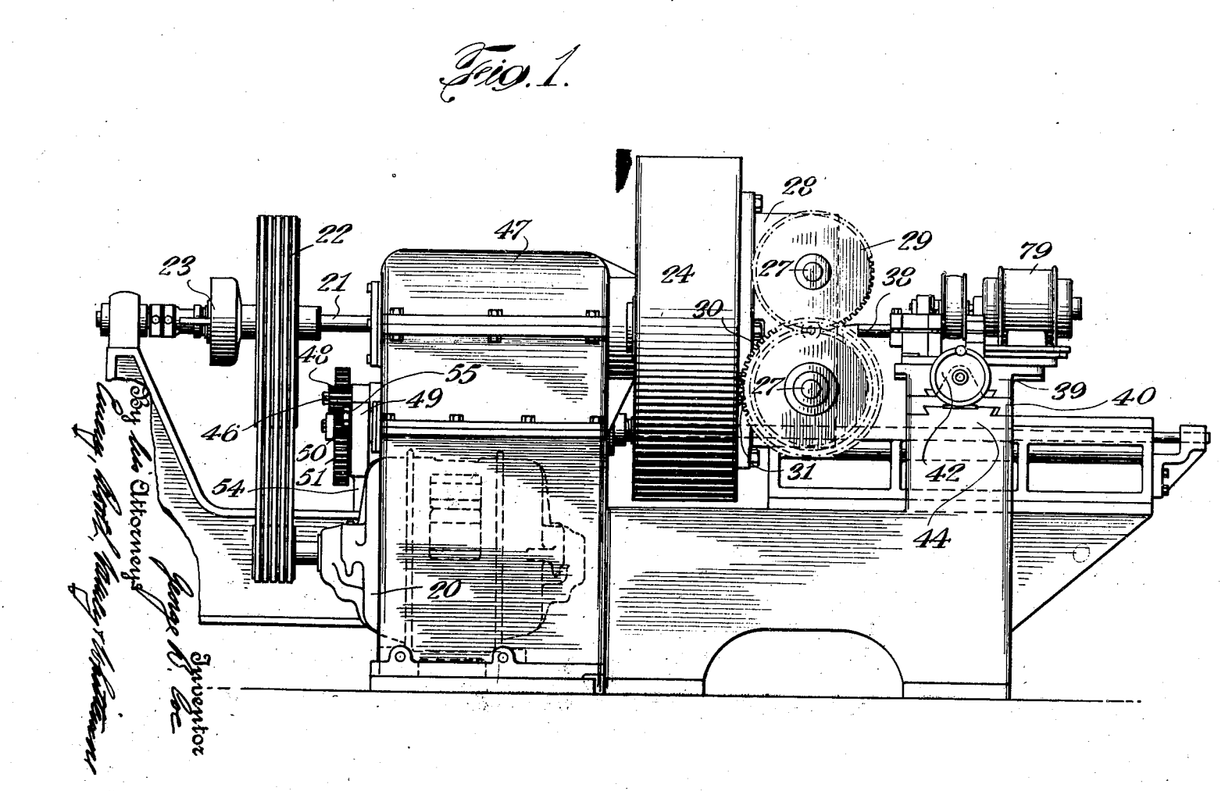
Fig. 1 is a side elevation of a die shaping machine constructed in accordance with one embodiment of this invention.
Figure 4:
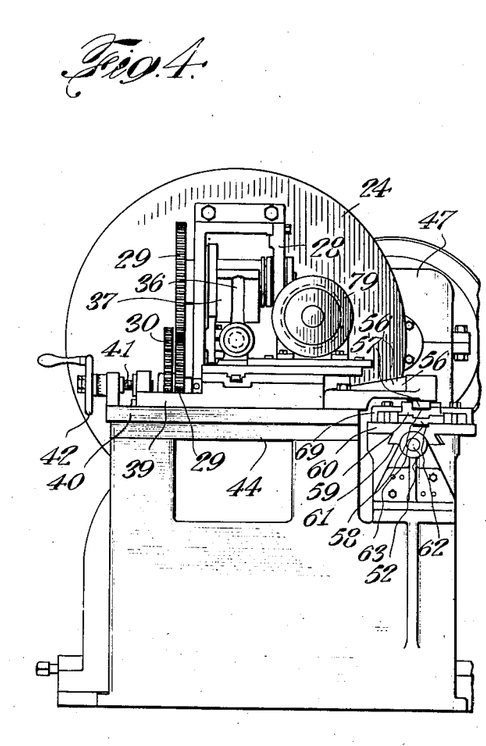
Fig. 4 is an end elevation looking from the right of Fig. 1.
Figure 5:
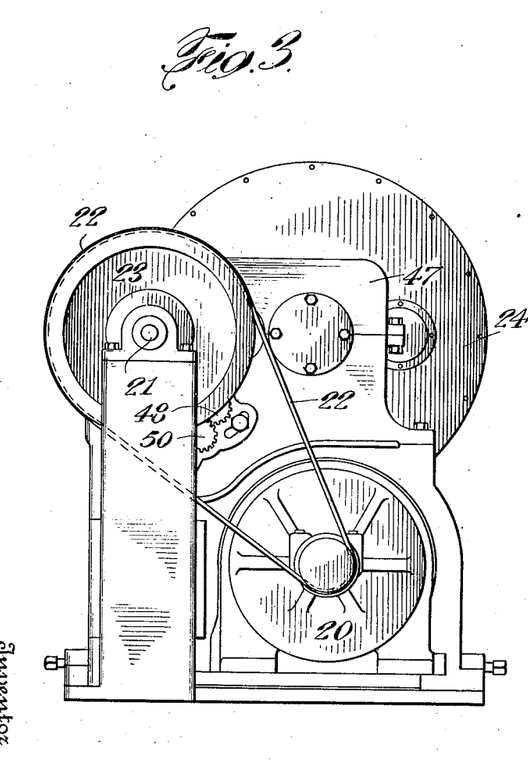
Fig. 5 is a sectional view on the line 5—5 of Fig. 2.
Figure 6:
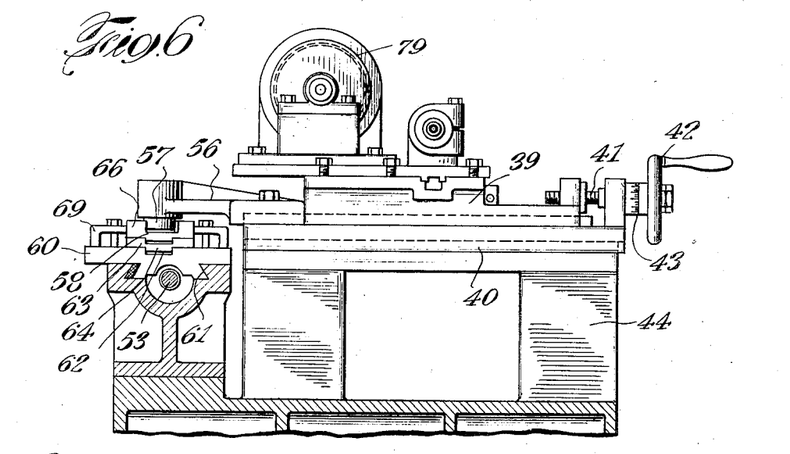
Figs. 6, 7, 8, 9 and 10 are cross sectional views on the lines indicated in Fig. 2 looking in the directions of the appropriate arrows.
Figure 7:
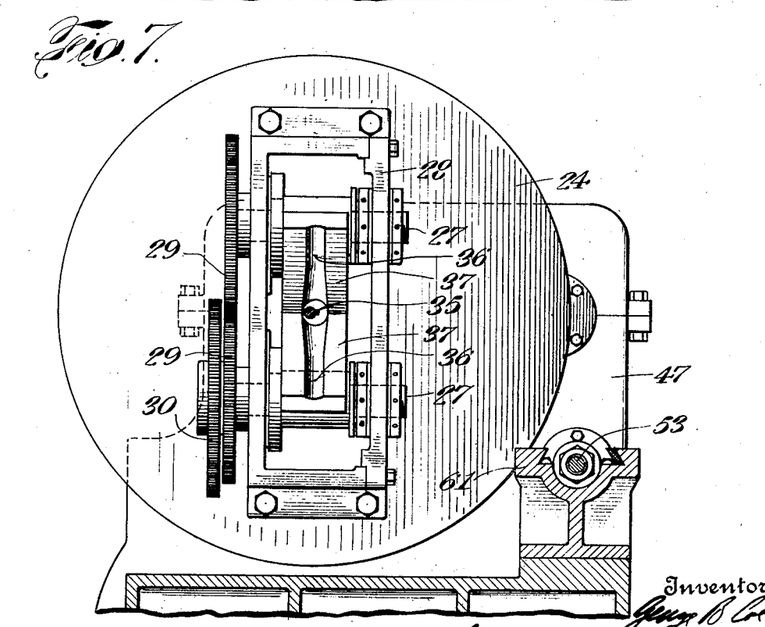
Figure 13:
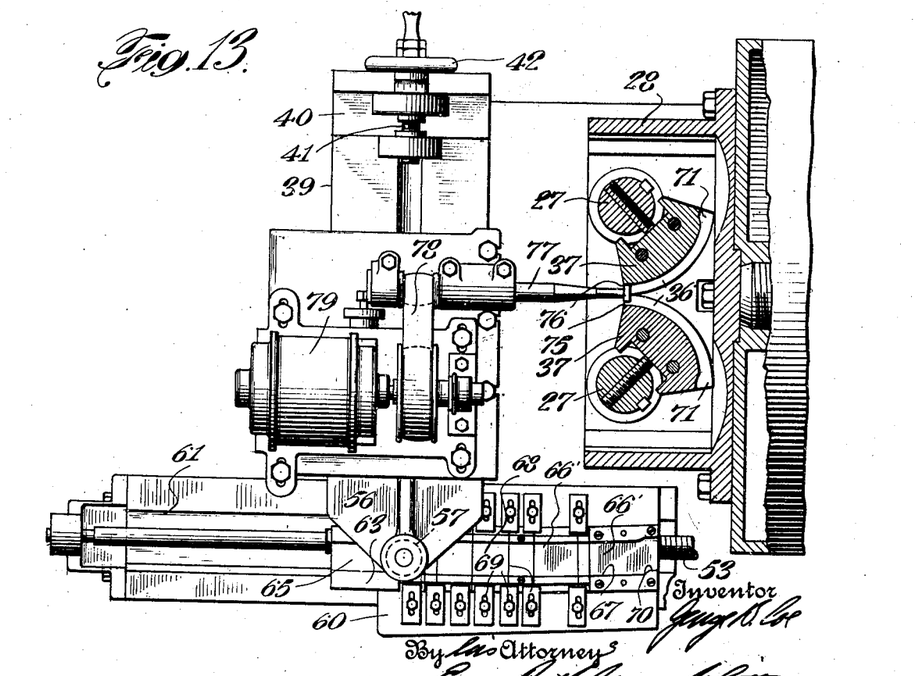
Fig. 13 is a top plan view of part of the machine showing the control of the cutter by the pattern slide and illustrating in horizontal section the work and work holder in a different position from that shown in Fig. 1, and also showing a rotary grinder in place of the cutter shown in the other figures.

In operation, assuming the parts to be in the position illustrated in Figs. 2 and 5, operation of the power shaft 21 will rotate the work holder 24 through the reduction gears 26 so as to revolve the work pieces around the cutter 35, the depth of cut being controlled by the adjustment of the cutter slide 39 as a result of setting the screw 41. Rotation of the work holder also revolves the gear 33 around the stationary gear 34 so as to drive the reduction gear train 32 and in turn rotate the shafts 27 in proportion to the rotation of the work holder so as to impart a suitable feeding movement to the work pieces past the cutter 35 as they rotate around it. Simultaneously therewith the screw shaft 53 is driven at a predetermined speed to move the pattern slide 60 at a predetermined rate so as to control the lateral position of the cutter during the cutting operation and to form the desired tapered or other shape of groove in the work. As illustrated, a suitable arrangement and combination of the various inserts 66, is provided so that the cutter will shape a tapered groove of the desired length followed by a straight groove. Assuming that the parts are in the position illustrated in Figs. 2 and 5, the offset 70 will cause the cutter to first cut the wall of the bell mouth 71 and then be shifted to cut a gradually tapering groove, after which, as the roller 57 enters the straight portion of the pattern slot, the cutter will be held against lateral movement and a straight groove will be formed in the work pieces. As the end of the groove is reached, the insert 72 shifts the arm 56 so as to cause the cutter to cut a slight enlargement at that end of the groove, see Fig. 13. At the end of each cut, the operator reverses the machine, by reversing the driving motor 20 in the illustrated embodiment, and at the same time adjusts the cutter for a new cut by suitable adjustment of the traverse slide 40. The motor 20 may be a multi-speed motor for rapid movement or adjustment of the parts when no cut is being made. It will be apparent that the machine is also adapted to suitable grinding operations in which event a grinding cutter 76 is secured in place and its rotary spindle 77 driven by a belt 78 from a suitable motor 79 mounted directly on the cutter slide.

The cutter (or grinder) is adjustable longitudinally of its spindle axis to move into or out of position. As shown in the drawings the motor and grinder are slidably mounted on the slide 39. Fig. 2 shows the slot and bolt arrangement for retaining the sliding base to permit this movement. This provides for changing tools on the spindle without removing the work pieces by withdrawing the spindle. There is also an added advantage to this arrangement. In certain places along the length of the grooves being formed in the work pieces it may be desirable to form relief clearances, that is, the grooves near the meeting edges of the work pieces are flared out in a cross section through the groove so as to depart from circular shape (considering both grooves taken together). These flaring clearances may be formed by backing off the cutter from the plane of centers of the axes 27 about which the work pieces rotate as they revolve about the axis of the shaft 25. The effect of this can be clearly comprehended by reference to Fig. 5. The cutter when backed off will not touch the bottoms of the grooves 36 because they diverge from each other as the distance from the plane of centers increases; but it will contact the meeting edges of the work pieces because they do not spread apart so much as to be out of range of the cutter, and the latter consequently is able to cut an arcuate flaring clearance in the edges of the rocker grooves.

One effect of changing the size of gear 51 on the pattern feed screw 53 will now be obvious. It changes the rate of feed of the pattern slide with respect to the rate of rotation of the work pieces about their own axes. Consequently the inclined portion 67 of the pattern groove which has herein been made with a given fixed inclination will move at a different rate and will traverse the cutter at a different rate and this will change the slope of the tapered portion of the grooves which are being cut in the work pieces.

I claim as my invention:—

1. The combination in a metal working machine for simultaneously shaping two complemental work pieces, of a cutter, a rotary work holder for revolving said work pieces around said cutter and means for rotating said work pieces upon axes parallel to each other and perpendicular to the axis of said work holder to feed said work pieces past said cutter.

2. The combination in a metal working machine of a cutter, a rotary work holder for revolving the work around said cutter, means for shifting said work relatively to said work holder to feed said work past said cutter and means for traversing said cutter during the cutting operation to vary the form of the cut.

3. The combination in a metal working machine, of a rotary work holder, a cutter, means for movably supporting a work piece on said work holder, means for rotating said work holder to revolve said work piece about said cutter, means for moving said work piece on said holder to feed said work piece past said cutter, means for shifting said cutter during the cutting operation to control the shape of cut and means for traversing said cutter at the end of each cutting stroke.

4. The combination in a metal working machine for grooving the curved surfaces of a pair of work pieces, of a rotary work holder for holding said work pieces with said curved surfaces in contact, a cutter positioned between said work pieces, means for movably supporting said work pieces on said work holder, means for rotating said work holder to revolve said work pieces about said cutter, means for moving said work pieces on said holder to feed said curved surfaces past said cutter, means for shifting said cutter laterally during the cutting operation to vary the shape of cut and means for traversing said cutter at the end of each cutting stroke.

5. The combination in a metal working machine for grooving the curved surfaces of a work piece, of a rotary work holder, a cutter, a rotatable work supporting shaft for supporting said work piece on said work holder, means for rotating said work holder to revolve said work piece about said cutter, means for rotating said shaft for moving said work piece relatively to said holder to feed said work piece past said cutter, means for shifting said cutter laterally during the cutting operation to control the shape of cut and means for traversing said cutter at the end of each cutting stroke.

6. The combination in a metal working machine of a rotary work holder, a cutter, a cutter supporting cross slide, means for movably supporting complemental work pieces on said work holder, means for rotating said holder to subject each of said work pieces to the action of said cutter, means for moving said cutter supporting cross slide during the cutting operation to control the form of cut, and means for adjusting the position of said slide at the beginning of each cut.

7. The combination in a metal working machine of a work holder, a cutter, a cutter supporting cross slide, means for movably supporting complemental work pieces on said work holder, means for rotating said support so as to subject each of said work pieces to the action of said cutter, means for moving said cutter supporting cross slide during the cutting operation to control the form of cut, including a slotted pattern member, a connection between said slide and the slot of said member, and means for causing relative movement between said member and said slide.

8. The combination in a metal working machine of a cutter, a rotatable work holder associated therewith, means for supporting work on said holder to be engaged by said cutter, means for rotating said work holder for revolving said work around said cutter and means operated by rotation of said work holder for feeding said work past said cutter.

9. The combination in a metal working machine of a cutter, a rotatable work holder associated therewith, a rotatable work supporting shaft for supporting a work piece on said holder in position to be engaged by said cutter, means for rotating said holder to revolve said work piece around said cutter and means operated by rotation of said work holder for rotating said shaft to swing said work piece past said cutter as it revolves therearound.

10. The combination in a metal working machine of a cutter, a rotatable work holder associated therewith, a rotatable work supporting shaft for supporting a work piece on said holder in position to be engaged by said cutter, means for rotating said work holder to revolve said work piece around said cutter and reduction gearing operated by rotation of said work holder for rotating said work supporting shaft to feed said work piece past said cutter as it revolves therearound.

11. The combination in a metal working machine of a cutter, a rotatable work holder associated therewith, a rotatable work supporting shaft for supporting a work piece on said holder in position to be engaged by said cutter, means for rotating said work holder to revolve said work piece around said cutter, reduction gearing operated by rotation of said work holder for rotating said work supporting shaft to feed said work piece past said cutter as it revolves therearound, and means for moving said cutter laterally during the cutting operation.

12. The combination in a metal working machine of a cutter, a rotatable work holder associated therewith, a rotatable work supporting shaft for supporting a work piece on said holder in position to be engaged by said cutter, means for rotating said work holder to revolve said work piece around said cutter, reduction gearing operated by rotation of said work holder for rotating said work supporting shaft to feed said work piece past said cutter as it revolves therearound, and means for reversing the operation of said machine at each end of a cut and means for traversing said cutter at the end of each cut.

13. The combination in a metal working machine of a cutter, a rotatable work holder, a supporting shaft therefor, means for rotating said shaft, a movable work support on said holder which is revolved upon rotation of the holder and means secured to said holder and connected to said support for moving said support upon rotation of said holder.

14. The combination in a metal working machine of a cutter, a rotatable work holder, a supporting shaft for said holder, means for rotating said shaft, a rotatable work supporting shaft on said holder, reduction gearing connected to said work supporting shaft and mounted on said holder, and a stationary gear supported by said first named shaft for operating said reduction gearing upon rotation of said holder.

15. The combination in a metal working machine of a cutter, a cutter slide, means including a pattern slide for moving said cutter slide during the cutting operation for varying the form of cut, a plurality of detachable slot-forming inserts, means for securing any desired arrangement of inserts on said pattern slide to provide a predetermined pattern slot, a cutter slide operating arm operatively associated with said slot and means for moving said pattern slide to shift said arm.

16. The combination in a metal working machine of a cutter, a cutter slide, means for moving said cutter slide during the cutting operation for varying the form of cut including a pattern slide having a laterally inclined groove in its upper face, a plurality of detachable slot-forming inserts, means for securing certain of said inserts in said groove, an intermediate slide mounted on said pattern slide and movable along said groove, said intermediate slide having a longitudinally extending groove in its upper face, means for securing other of said inserts in the longitudinal groove of said intermediate slide and for clamping said slide in abutting relationship to said first named inserts to form a predetermined pattern slot, a cutter slide operating arm operatively associated with said slot, and means for moving said pattern slide to operate said arm.

17. The combination in a metal working machine of a cutter, a cutter slide, means for moving said cutter slide during the cutting operation for varying the form of cut including a pattern slide having an inclined groove in its upper face, a plurality of detachable inserts secured in said groove and forming an inclined slot, an intermediate slide movable in said groove and provided with a longitudinally extending slot in its upper face, a plurality of inserts positioned in the groove of said intermediate slide for forming a longitudinally extending slot, means for clamping said slide and associated inserts in abutting relationship with said first named inserts to form a predetermined pattern slot, a cutter slide operating arm operatively associated with said slot, and means for moving said pattern slide to operate said arm.

18. The method of forming a groove of predetermined contour in a work piece which comprises rotating said work piece past a forming tool, simultaneously revolving said work piece in an orbital path about a fixed center and varying the relative positions of said tool and orbit to control the form of groove.

19. The method of forming an arcuate groove of predetermined varying contour in the curved surface of a work piece which comprises rotating said work piece about an axis to feed said surface past a forming tool, simultaneously revolving said work piece in an orbital path about a fixed center and varying the position of said tool relatively to said center during movement of said work piece.

20. The combination in a metal working machine of a rotary work holder, a tool operatively associated with said work holder, means for rotating said work independently on said work holder to feed it past said tool and means for shifting said tool during operation thereof to cut said work in a predetermined pattern.

21. The combination in a metal working machine for simultaneously shaping two complemental work pieces of a rotary work holder, means for securing said work pieces on said holder, a cutter arranged to operate on both of said work pieces when said work holder is rotated, and means for rotating said work pieces independently on said work holder to feed it past said cutter.

22. The combination in a metal working machine of a cutter, a rotatable work holder associated therewith, a work supporting housing removably mounted on said work holder, means for rotating said work holder to revolve said work around said cutter and means on said housing for feeding said work past said cutter.

23. The combination in a metal working machine of a cutter, a rotatable work holder associated therewith, a work supporting housing removably mounted on said holder, a movable work supporting member associated with said housing, means for rotating said work holder to revolve said work around said cutter and means on said housing for feeding said work past said cutter.

24. The combination in a metal working machine of a cutter, a rotatable work holder associated therewith, a work supporting housing removably mounted on said work holder, a work supporting shaft mounted in said housing, means for rotating said work holder to revolve said work around said cutter and gearing supported on said housing and operated by rotation of said holder for moving said shaft to feed said work past said cutter.

25. The method of forming flaring clearances at the meeting edges of circumferential grooves in curved work pieces which comprises, rotating a pair of work pieces about their own axes while revolving them in working relationship about a tool located in the plane joining the parallel axes of the work pieces to form semi-circular grooves in the work pieces, and thereafter moving the tool off the said plane along the axis of revolution of the work piece while continuing the movement of the work pieces to form the flaring clearances.

26. In a machine tool for machining rolls of the kind described, the combination of a rotatable table provided with bearings for supporting a pair of rolls to be machined with their axes parallel to one another and to said table, a tool holder carried on the frame of the machine and extending between the pair of rolls so mounted, means for rotating said table, mechanism for rotating each roll about its axis to feed the same to a tool in said holder and mechanism for automatically moving the tool holder in directions transverse to the axis of rotation of the table as the same rotates and for the purpose specified.

27. In a machine tool for machining rolls of the kind described, the combination of a rotatable table provided with bearings for supporting a pair of rolls to be machined with their axes parallel to one another and to said table, a tool holder movably mounted on the machine frame and extending between the pair of rolls so mounted, means for moving said tool holder radially with respect to said table, means for rotating said table, mechanism for rotating each roll about its axis to feed the same to a tool in said holder and mechanism for moving the tool holder in directions transverse to the axis of rotation of the table as the same rotates, and for the purpose specified.

28. A method of machining rolls, for example, Pilger rolls, which consists in (a) rotating a pair of rolls having their axes disposed parallel to one another about an axis which extends between the rolls in a direction at right angles to the axes thereof (b) subjecting the rolls as they rotate to cuts across the peripheral faces thereof from a tool located between the rolls, and (c) periodically moving the tool radially with respect to the said axis of rotation of the pair of rolls in such a manner that the cuts are made in accordance with the desired contour of the rolls.

GEORGE B. COE.